US011009172B2

(12) United States Patent
Weisenberg (10) Patent No.: US 11,009,172 B2
(45) Date of Patent: May 18, 2021

(54) INTERNAL LINING FOR PIPE SURFACES AND METHOD OF LINING PIPES

(71) Applicant: Kent Weisenberg, Fleming Island, FL (US)

(72) Inventor: Kent Weisenberg, Fleming Island, FL (US)

(73) Assignee: SIPP TECHNOLOGIES, LLP, Wichita, KS (US)

( * ) Notice: Subject to any disclaimer, the term of this patent is extended or adjusted under 35 U.S.C. 154(b) by 0 days.

(21) Appl. No.: 16/440,061

(22) Filed: Jun. 13, 2019

(65) Prior Publication Data
US 2019/0293222 A1 Sep. 26, 2019

Related U.S. Application Data

(62) Division of application No. 15/589,002, filed on May 8, 2017.

(60) Provisional application No. 62/427,880, filed on Nov. 30, 2016.

(51) Int. Cl.
*F16L 55/164* (2006.01)

(52) U.S. Cl.
CPC .................. *F16L 55/164* (2013.01)

(58) Field of Classification Search
CPC .................................... F16L 55/164
USPC ........................................ 138/97
See application file for complete search history.

(56) References Cited

U.S. PATENT DOCUMENTS

| | | | | | |
|---|---|---|---|---|---|
| 4,439,469 A | * | 3/1984 | Wood | ..... | B05D 7/222 427/230 |
| 4,640,313 A | ‡ | 2/1987 | Stanley | ..... | B29C 47/0023 138/137 |
| 4,786,525 A | * | 11/1988 | Kayser | ..... | B05D 7/22 427/236 |
| 5,389,692 A | ‡ | 2/1995 | Bertram | ..... | B05D 7/222 428/160 |
| 5,409,567 A | * | 4/1995 | Lytle | ..... | C23F 1/18 252/79.2 |
| 5,618,616 A | ‡ | 4/1997 | Hume | ..... | E03F 3/06 428/31 |

(Continued)

OTHER PUBLICATIONS

"Guidance on Best Practices for the Installation of Spray Polyurethane Foam", 2012, Spray Foam Coalition of the American Chemistry Council Center for the Polyurethanes Industry. pp. 27-28. (Year: 2012).*

(Continued)

*Primary Examiner* — Craig M Schneider
*Assistant Examiner* — David R Deal
(74) *Attorney, Agent, or Firm* — Thomas C. Saitta (57) ABSTRACT

A pipe lining having at least two material layers, a first elastomeric layer spray applied directly to the inside of a pipe which acts as a hydrophobic, ductile membrane, and a second rigid layer is spray applied to the first layer prior to complete curing of the first layer. One or more additional layers may be applied to the second layer to provide additional abrasion, erosion or chemical resistance to the second layer. An intermediate reinforcing layer may be disposed between the first and second layers. The first layer cures into a closed cell elastomeric foam, such that stress and other forces are not passed from the pipe to the rigid second layer.

18 Claims, 3 Drawing Sheets

(56) References Cited

U.S. PATENT DOCUMENTS

| | | | | |
|---|---|---|---|---|
| 5,622,209 | A * | 4/1997 | Naf | B05D 7/22 138/97 |
| 5,653,555 | A * | 8/1997 | Catallo | B29C 63/34 156/287 |
| 5,656,117 | A * | 8/1997 | Wood | F16L 55/1654 156/287 |
| 5,791,378 | A ‡ | 8/1998 | Stephens | E03F 3/06 138/97 |
| 6,138,718 | A ‡ | 10/2000 | Maimets | F16L 55/163 138/97 |
| 6,167,912 | B1 ‡ | 1/2001 | Stephens | F16L 55/175 138/140 |
| 6,514,346 | B1 * | 2/2003 | Nichols | B05B 13/0636 118/254 |
| 6,632,475 | B1 * | 10/2003 | Bleggi | B05B 3/027 118/302 |
| 6,706,384 | B1 ‡ | 3/2004 | Hume | B32B 5/18 428/30 |
| 6,926,466 | B2 * | 8/2005 | Pare | B05B 7/0408 118/317 |
| 7,267,507 | B2 ‡ | 9/2007 | Lecinq | F16L 9/153 138/97 |
| 7,279,196 | B2 ‡ | 10/2007 | Hume | B32B 5/18 427/23 |
| 7,348,047 | B2 ‡ | 3/2008 | Snell | B32B 3/00 428/158 |
| 7,563,496 | B2 ‡ | 7/2009 | Watson | B29C 63/18 405/211.1 |
| 7,601,390 | B1 * | 10/2009 | Kinnaird | C04B 41/009 118/317 |
| 7,682,655 | B1 * | 3/2010 | Weisenberg | F16L 58/1027 427/236 |
| 7,858,149 | B2 * | 12/2010 | Gillanders | C09D 163/00 |
| 7,867,558 | B1 * | 1/2011 | Weisenberg | B05B 13/0636 427/236 |
| 8,596,917 | B2 ‡ | 12/2013 | Emmons | F16L 55/1655 138/129 |
| 9,353,900 | B2 ‡ | 5/2016 | Bichler | F16L 55/1656 |
| 2003/0116211 | A1 ‡ | 6/2003 | Ward | F16L 55/179 138/98 |
| 2004/0175559 | A1 * | 9/2004 | Hume | C04B 41/009 428/316.6 |
| 2010/0243092 | A1 ‡ | 9/2010 | Gillanders | B05D 3/12 138/97 |
| 2012/0279600 | A1 ‡ | 11/2012 | Kiest, Jr. | F16L 55/179 138/97 |
| 2015/0132562 | A1 * | 5/2015 | Roosen | B05D 7/582 428/304.4 |

OTHER PUBLICATIONS

Properties of the Polyurethane (PU) Light Foams: Advances in Material Science, vol. 6, No. 2 (10), Oct. 2006, by Wit Witkiewicz and Adrzej Zielinskie. (Year: 2006).‡

Effect of isocyanate content on thermal and mechanical properties of polyurea; Polymer 54 (2013), pp. 3079-3085, by K. Holzworth et al. (Year: 2013).‡

\* cited by examiner

‡ imported from a related application

INTERNAL LINING FOR PIPE SURFACES AND METHOD OF LINING PIPES

BACKGROUND OF THE INVENTION

This invention relates generally to linings for internal pipe surfaces, and more particularly relates to such linings formed of multiple layers, and even more particularly relates to such linings adapted and adaptable for use in the structural repair or remediation of degraded, damaged or leaking pipes, or such linings adapted and adaptable to improve or upgrade qualities and characteristics of pipes prior to or after use or installation. The invention further relates to methods for applying and forming the lining on the interior of the pipe.

There are many known compositions for internal pipe linings that provide improved properties or may be used to repair degraded or damaged pipes already in use. Many of the known linings are referred to by the acronym SIPP, which stands for sprayed-in-place pipe, and application of the linings typically involves single or multiple passes of equipment applying one or more polymeric material layers to the interior of the pipe. These linings are most closely related to this invention, and comprise linings made from polymers sprayed onto the interior wall of the pipe. There are however numerous problems or drawbacks associated with the known compositions, laminate combinations and methodologies.

One problem in the SIPP market is that thermoset polymeric materials used to create a rigid internal lining are unable to adequately resist cracking caused by exothermic reaction and or radial shrinkage during the curing process. When the polymeric material is applied too thickly in one pass it often has the tendency to crack, as the increased heat from the exotherm can result in embrittlement of the polymer as it gets close to its glass transition temperature $T_g$. Secondly, there is always some radial and longitudinal shrinkage during curing, and if the polymeric material is adhered directly to the pipe substrate this shrinkage can cause cracking of the polymeric material, especially in situations of high exotherm and mismatch in the coefficient of thermal expansions of different interfacing materials. Furthermore, there is no guarantee of 100% adhesion or precise circumferential thickness with these formulations. If you have thinner material or the material is not fully adhered to the pipe, cracking, delamination or other failure may occur in these areas due to the strain applied while curing or when subjected to internal or external loading.

The laminate system of this invention allows the rigid polymeric layer to move to some extent and will absorb strains caused by external factors, as an elastomeric layer is provided between the inner pipe surface and the rigid internal layer. Thus, the rigid polymeric layer is no longer adhered directly to the actual pipe substrate at any point but rather is adhered to an elastomeric layer, which has the capability to expand and yield to reduce the reaction forces between the rigid liner and the pipe when these strains occur. In other words, the elastomeric lining in this invention allows the rigid liner to be 'suspended' in the host pipe so that the internal and/or external forces or strain are not fully transferred onto the rigid liner but are instead dissipated throughout the elastomeric layer.

A major issue with developing a high modulus polymeric layer for lining pipe has been the need to avoid excessive adhesion to the host pipe. Many polymeric formulations, typically polyureas, polyurea/polyurethane hybrids, polyurethanes, and epoxy systems, have been developed that possess high modulus and strength—flexural, tensile and compressive—in order to provide a rigid tubular member. These formulations, however, have three significant issues. While these materials possess the required rigidity, they are relatively brittle, so unless applied at considerable thickness (which is not cost effective) they cannot survive internal working fluid pressure, transverse shear or overburden. Typically-formulated hybrids are not moisture tolerant due to urethane linkages and are thermosetting, so they radially and longitudinally shrink during the curing process, creating small annuluses or circumferential gaps between the liner and the host pipe. Additionally, these materials may excessively adhere to the pipe wall where there are concave, convex and rough surface profiles that are created in the cleaning process, e.g., from remote abrasive blasting, abrasive pigging, etc., or exist in the inherent profile of the pipe wall, such as at joints and taps, etc. If the liner is too firmly adhered to the pipe, the liner cannot survive a fracture in the pipe. Once fractures or remarkable deformations happen on the pipe where the rigid lining is adhered, the displacements on the pipe will be transferred onto the rigid lining via adhesion bonding, causing the brittle lining material to crack, fracture or tear. Simulation testing has shown that if the adhesion strength between the pipe and rigid lining is above 200-300 psi, a crack on the host pipe which was initiated and propagated by external load will propagate into the rigid lining and cause material failure. Additionally, when the liner is loaded with internal pressure under normal working condition (must meet an MAOP of 150 psi—safety factor of 2—per M28 for a Class IV liner), FEA simulation and lab testing shows the internal pressure will increase the stress on the liner where the cracks are initiated to the point of breaking the lining material. And finally, if an attempt is made to impede adhesion to the host pipe, such as by applying a mold release on the interior of the pipe—the rigid lining will detach from the pipe wall after curing, creating an annulus between liner and pipe into which water and/or effluent will infiltrate. The pipe liner must, per standard, seal at all terminations, service connections and other discontinuities in the pipe. If there is an annulus, even a very small one, caused by lack of adhesion to the host pipe, there is no way to seal for hydrostatic integrity.

Infiltration in any annulus remaining between the liner and the pipe is a true problem in today's pipeline rehabilitation industry when utilizing SIPP, cured-in-place pipe (CIPP), epoxy lining and other rigid, structural thermoset lining methods. The amount of radial shrinkage has been reduced by formulation over the years, yet there is still an inherent shrinkage of at least 1%, which creates an unacceptable annular space between the liner and the host pipe. Unless there are complete and absolute seals at the interface of lateral intrusions (e.g., pipe T's) and liner terminations through adhesion or mechanical methods, hydrostatic infiltration will occur. Any inflow or infiltration is bad as it can simply travel the annulus and leak out through the joints, cracks and/or perforations, which defeats the purpose of using lining correction in the pipe. While loss of drinking water from damaged pipes in a water supply system is to be avoided, liquid loss from industrial pipelines transmitting hazardous materials may be dangerous. More importantly to the structural Class IV liner, if hydrostatic infiltration occurs while the pipe is under internal pressure, the infiltration basically equalizes the pressure in the system—thereby rendering even the most structural liner useless in regard to its resistance to loading.

For potable water applications, the internal pipe lining is required to meet the American Water Works Association (AWWA) standards and in particular the standards set out below. Class IV linings are the strongest structural pipe linings of which the internal pressure and external load resistance capabilities do not rely on the material adhesion on the host pipe and the structural support from the pipe wall. This type of lining possesses the following characteristics:

4.2.4 Class IV Linings.

4.2.4.1 Class IV linings, termed fully structural or structurally independent, possess the following characteristics:
1. The lining has a long-term hoop strength which equal to or greater than the MAOP of the pipe to be rehabilitated. This hoop strength is tested independently from the host pipe.
2. The lining has long-term resistance to external and live loads and the resistance is independent from the host pipe.
3. The lining has a short-term hoop strength which equal to or greater than all short-term loads, such as sustained and surge (vacuum and occasional and recurrent surge) pressures and live loads even if these loads are in excess of the capacity of the host pipe. This hoop strength is tested independently from the host pipe.

4.2.4.2 Class IV linings are sometimes considered to be structurally equivalent to new replacement pipe, although such linings will have markedly different properties in terms of buckling and longitudinal bending resistance than the original host pipe. These linings should be designed with adequate load resistance for all reasonable assumptions of loading conditions independent of the host pipe. By necessity, they will be of smaller internal diameters than the host pipe. However, their design should also consider practical implications to facilitate the continued service objectives of the host pipe such as the ability to provide water to service lines and mains without compromising the hydrostatic integrity of the overall lining system. (See AWWA M28, Chapter 11-3rd ed.)

4.2.4.3 Class IV linings can also be used in circumstances similar to those for Class II and III, but their use is essential for host pipes suffering from generalized external corrosion where the mode of pipe failure has been, or is likely to be, longitudinal cracking. The host pipe suffers full loss of hoop strength because of the longitudinal crack. Other catastrophic modes (e.g. spiral cracks, circumferential cracks, a leadite style joint failure blow-out) can also happen on the pipe wall where more liner structural resistance is required than traditional hole spanning structural resistance.

4.2.4.4 Some available pipe rehabilitation technologies can offer Class II, Class III and even Class IV linings, while a given lining system may be rated as Class IV for MAOP levels up to a threshold value and as a Class II and III system at higher pressures.

4.2.4.5 Additional Design Considerations: In addition to internal pressure loads, linings are also required to sustain external buckling loads during periods when the host pipe is depressurized, as well as transient and cyclic overpressure and/or vacuum loads. Some lining systems (Classes III and IV) can be designed to offer significant inherent resistance to such external loads, while others (Class II) depend solely on adhesion to the host pipe wall. Inherent resistance to external buckling normally varies with increased lining thickness and hence cost. Care should therefore be taken to ensure that such performance requirements are accurately defined.

It is an object of this invention to provide an internal pipe lining composition, laminate and methodology of application that addresses the various problems and shortcomings discussed above, and which meet applicable standards for potable water and other fluid systems.

SUMMARY OF THE INVENTION

The invention in various embodiments comprises an improved lining for internal pipe surfaces, and the method of installing and forming the liner within the pipe, in particular for internal surfaces of pipelines requiring structural repair per the AWWA M28 standard classifications for Class III and Class IV liners and the ASTM F3182-16 standard. The composite may or may not include materials that are NSF/ANSI certified for drinking water. The lining is a composite laminate having a first anchoring layer that has a low modulus, a low Poisson's ratio, a cellular construct and high elongation properties and a second layer that has a high modulus, a high Poisson's ratio and low elongation properties and is bonded to the inside of the anchoring layer via intermolecular cohesion. An optional third layer may be applied that has intermolecular cohesion to the inside of the second layer to provide additional abrasion, erosion resistance, chemical resistance other desirable properties to the composite. Alternatively, an intermediate reinforcing layer, such as a layer of helically wound filament or the like, may be positioned between or at the junction of the first and second layers.

The first layer is applied to the interior of the pipe, preferring by spray application, and the second layer is applied to the first layer prior to the first layer achieving full cure, such that improved bonding is accomplished between the layers. The first layer cures into a liquid impermeable, elastomeric, closed cell foam structure and the second layer cures into a rigid tubular member, such that a "pipe-within-a-pipe" is formed, the elastomeric layer being able to stretch and expand both during the curing of the rigid layer and after full cure of all layers. The lining and the methodology is applicable to any size pipe.

In alternative expression, the invention is a combination pipe and pipe liner, the pipe liner adhered to the inside of the pipe, the liner comprising a first layer and a second layer; said first layer formed of a curable polymeric material applied to said pipe and allowed to cure such that said first layer is an elastomeric foam layer, and said second layer formed of a curable thermosetting polymeric material applied to said first layer and allowed to cure such that said second layer is a rigid layer bonded to said first layer.

Furthermore, the invention wherein said first layer possesses a modulus of elasticity of approximately 100 to 10,000 psi, and wherein said second layer possesses a modulus of elasticity of approximately 250,000 to 750,000 psi; wherein said first layer possesses a Poison's ratio not greater than approximately 0.25, and wherein said second layer possesses a Poisson's ratio not less than approximately 3.0; wherein said first layer possesses elongation of approximately 500 to 1500%, and wherein said second layer possesses elongation of less than approximately 25%; wherein said first layer possesses elongation of approximately 500 to 1500%, and wherein said second layer possesses elongation of approximately 1 to 25%; wherein said first layer possesses a gel rate approximately 2-300 seconds and becomes tack-free in approximately 60-600 seconds, and wherein said second layer possesses a snap cure rate of approximately 3-300 seconds and a full cure rate of 1-24 hours; wherein said first layer is formed of a hydrophobic/moisture tolerant polymeric material, characterized in that said polymeric material does not absorb or react to moisture or fluids prior to curing and is liquid impermeable after curing; further comprising a third layer, said third layer formed of a polymeric material applied to said second layer and allowed to cure; wherein said second layer polymeric material is applied to said first layer polymeric material prior to said first layer polymeric material fully curing into said elastomeric foam layer; further comprising an intermediate reinforcing layer between said first layer and said second layer; wherein said intermediate reinforcing layer comprising a helically wound filament; wherein said helically wound filament is resin-impregnated and said helically wound filament is chosen from the group of filaments consisting of carbon fiber, E-glass and Aramid fiber; and/or wherein the majority of said helically wound filament is embedded within said second layer.

Alternatively, the invention is a pipe liner comprising a tubular elastomeric polymeric foam first layer and a tubular rigid polymeric second layer, said second layer bonded internally to said first layer; wherein said first layer possesses a modulus of elasticity of approximately 100 to 10,000 psi, and wherein said second layer possesses a modulus of elasticity of approximately 250,000 to 750,000 psi; wherein said first layer possesses a Poison's ratio not greater than approximately 0.25, and wherein said second layer possesses a Poisson's ratio not less than approximately 3.0; wherein said first layer possesses elongation of approximately 500 to 1500%, and wherein said second layer possesses elongation of approximately 1 to 25%; wherein said first layer possesses a gel rate of approximately 2-300 seconds and becomes tack-free in approximately 60-600 seconds, and wherein said second layer possesses a snap cure rate of approximately 3-300 seconds and a full cure rate of 1-24 hours; wherein said first layer is formed of a hydrophobic/moisture tolerant polymeric material, characterized in that said polymeric material does not absorb or react to moisture or fluids prior to curing and is liquid impermeable after curing; further comprising a third layer, said third layer formed of a polymeric material applied to said second layer and allowed to cure; wherein said second layer polymeric material is applied to said first layer polymeric material prior to said first layer polymeric material fully curing into said elastomeric foam layer; further comprising an intermediate reinforcing layer between said first layer and said second layer; wherein said intermediate reinforcing layer comprising a helically wound filament; wherein said helically wound filament is resin-impregnated and said helically wound filament is chosen from the group of filaments consisting of carbon fiber, E-glass and Aramid fiber; wherein the majority of said helically wound filament is embedded within said second layer.

Additionally, the invention is a method of lining a pipe comprising the steps of: applying a first curable polymeric material to the inside of said pipe and allowing said polymeric material to cure to form an elastomeric foam first layer; applying a second curable thermosetting polymeric material to the inside of said elastomeric first layer to form a rigid second layer bonded to said first layer; said second curable thermosetting polymeric material being applied to said first curable polymeric material prior to said first curable polymeric material fully curing to form said elastomeric foam first layer. Furthermore, further comprising the step of choosing said first curable polymeric material such that said elastomeric foam first layer possesses a modulus of elasticity of approximately 100 to 10,000 psi, and choosing said second curable thermosetting polymeric material such that said rigid second layer possesses a modulus of elasticity of approximately 250,000 to 750,000 psi; further comprising the step of choosing said first curable polymeric material such that said elastomeric foam first layer possesses a Poison's ratio not greater than approximately 0.25, and wherein said second layer possesses a Poisson's ratio not less than approximately 3.0; further comprising the step of choosing said first curable polymeric material such that said elastomeric foam first layer possesses elongation of approximately 500 to 1500%, and choosing said second curable thermosetting polymeric material such that said rigid second layer possesses elongation of approximately 1 to 25%; further comprising the step of choosing said first curable polymeric material such that said first curable polymeric material begins gelling in approximately 2-300 seconds and becomes tack-free in approximately 60-600 seconds, and choosing said second curable thermosetting polymeric material such that said second curable thermosetting polymeric material has a snap cure rate of approximately 3-300 seconds and a full cure rate of 1-24 hours; further comprising the step of choosing said first curable polymeric material such that said first curable polymeric material is formed of a hydrophobic/moisture tolerant polymeric material, characterized in that said first curable polymeric material does not absorb or react to moisture or fluids prior to curing and is liquid impermeable after curing; further comprising the step of applying an intermediate reinforcing layer onto said first layer prior to applying said second layer; wherein said intermediate reinforcing layer is composed of filaments and said step of applying said intermediate reinforcing layer comprises helically winding said filaments onto said first layer prior to full cure of said first layer; wherein said step of applying said intermediate reinforcing layer comprises allowing said first layer to partially cure sufficiently such that said filaments adhere to the surface of said first layer, and further such that the majority of said filaments become embedded in said second layer when said second layer is applied; wherein said intermediate reinforcing layer comprises UV-curable, resin-impregnated, helically wound filaments, and further comprising the step of exposing said filaments to UV radiation to cure said filaments upon applying said filament to said first layer.

DETAILED DESCRIPTION OF THE INVENTION

With reference to the drawings, which are meant to be non-limiting as to the scope of the invention and which are not to scale, the invention as formed by the methodology is shown and described in various embodiments as comprising a multi-layer or laminate pipe liner or lining 10, the liner 10 having a first or outer tubular layer 11 composed of a low modulus, high elongation, flexible, elastomeric material disposed within and bonded to a pipe 20, and a second or inner tubular layer 12 disposed within and bonded to the first layer 11 and which is composed of a rigid, durable, thermoset polymeric material. The term "elastomeric" as used herein defines a material that when provided in a tubular configuration may be stretched or expanded in the thickness or radial direction as well as longitudinally and circumferentially, and shall be taken to include auxetic foam materials, i.e., materials whose thickness increases when stretched in the lateral and/or longitudinal directions.

Before starting the pipe lining process for in-situ pipes 20 being repaired or lined, the pipe 20 should be cleaned using conventional methods, such as blasting and pigging, etc. The pipe 20 is then lined internally, preferably by spray application, with a preferably 100% solids, ductile, highly flexible, high elongation, elastomeric and hydrophobic/moisture tolerant polymeric material (as pipes usually have some moisture, especially at joints and intrusions). The term "hydrophobic/moisture tolerant" is used herein to mean that the lining material will not absorb or react to moisture or fluids when applied and during cure, such that the material may be applied in high humidity environments or applied over slightly damp substrates without affecting the final density or physical properties of the cured polymeric material. This first anchoring layer 11 adheres to the existing profile in the pipe 20 to seal the substrate so moisture intrusion from outside of the pipe 20 can be minimized when the second layer 12 is applied.

The elastomeric first layer 11 is moisture tolerant during application and hydrophobic upon curing such that it may be applied to pipe walls 20 that are not completely dry. The elastomeric first layer 11 is most preferably approximately 1-12 mm in thickness upon curing, with the optimal thickness being determined by pipe diameter. The first layer 11 mechanically bonds to the inner surface of the pipe or conduit 20, which may be composed of metal, polymer or concrete. The curable material for the first layer 11 is chosen such that it preferably starts gelling in approximately 2-300 seconds after spraying and becomes tack-free within approximately 60-600 seconds. Most preferably, the first layer 11 is composed of a material that cures to form a closed cell foam layer.

In the preferred embodiments, the elastomeric first layer 11 has a modulus of elasticity preferably of approximately 100 to 10,000 psi, a Poisson's ratio preferably not greater than approximately 0.25, including the negative Poisson's ratios of auxetic foam materials, and elongation preferably of approximately 500 to 1500%.

Another advantage of this elastomeric layer 11 is it allows the rigid second layer 12 to contain more polyurethane linkages in the formulation. Polyureas are elastomeric materials, and in order to create high tensile and flexural strength they have to be made as hybrids—polyurethane/polyurea mixtures. Inherently, polyurethanes are not moisture tolerant and they will foam when exposed to moisture. Typical hybrid formulations are inclusive of a moisture scavenger additive to quell this reaction which creates an issue as having more than a very limited amount of scavenger will start impeding the reaction of the 2-part system. By sealing the substrate with the first layer 11 prior to application of the material forming the rigid layer 12 the urethane content can be increased and the need for scavenger additives is reduced. This allows for a significant increase in the rigidity (hardness, density and flexural modulus) of the second layer 12 using different chemical formulations.

The second layer 12 of the laminate 10, a thermosetting polymeric material that cures into a rigid state, is now applied to the interior of the first layer 11. A SIPP apparatus may apply both lining materials 11/12 in one pass through the pipe 20, but typically the two layers 11/12 will be applied in two individual passes through the pipe 20. The second layer 12 is a high modulus composition that gives the composite liner 10 the strength to withstand internal pressure and overburden/external loading. The rigid lining material 12 is sprayed onto the first layer 11 prior to complete curing of the elastomeric first layer 11 so it can adhere to the elastomeric layer surface by intermolecular cohesion. Even though the second layer 12 is thermosetting and will shrink radially and longitudinally during the curing, annuluses are not formed between the pipe 20 and composite lining 10 as the shrinking strain of the rigid lining 12 is compensated for by the stretching of the elastomeric material lining 11, since these two layers 11/12 are bonded together.

The second layer 12 preferably has a snap cure rate of approximately 3 to 300 seconds and a final or full cure rate or 1 hour to 24 hours and is applied at a thickness of approximately 3 to 100 mm, dependent on the host pipe size. Upon curing, the second layer 12 has an inherent hoop strength independent of the original pipe—unlike conventional systems wherein the hoop strength of the interior rigid conduit can be reduced because of material shrinkage and nonuniform adhesion to the original pipe. The second layer 12 is able to move independently of the outer pipe 20 so as to minimize or obviate transfer of cracks and stress from the pipe 20. The second layer 12 may include reinforcing material, such as for example fibers, spheres or other reinforcing members. To overcome the internal working pressure, the lining material must have a minimal tensile strength above 40 MPa (calculated on a pipe maximum working pressure of 300 psi). The stress on conventional rigid lining without an elastomeric layer can easily exceed this stress limit due to the extra stress created on the pipe where there is shrinkage and nonuniform adhesion during curing.

In the preferred embodiments, the rigid polymeric layer 12 has a modulus of elasticity preferably of approximately 250,000-750,000 psi, a Poisson's ratio preferably not less than approximately 0.3, and elongation preferably of less than approximately 25%.

The overall composite structure of the liner 10 prevents the rigid lining component 12 from failure when cracks, fractures and other types of damages happen on the host pipe 20, as the two-layer composite 10 creates a differential in inter-laminate stresses. The elastomeric membrane 11 even when compressed allows for extensional, transformational and compressional movement of the pipe 20 that are significantly reduced, diverted, absorbed and not directly transferred to the rigid second layer 12. In the event the host pipe 20 suffers a through-wall longitudinal crack, the rigid second layer 12 will survive as the elastomeric material in the first layer 11 is able to stretch, delaminate from the pipe 20 or break, thereby precluding transfer of the destructive forces into the rigid second layer 12. The stretching, expanding and delamination characteristics of the elastomeric material 11 provide a soft connection instead of a rigid bonding between the host pipe 20 and rigid lining 12. This composite lining 10 design also provides the flexibility to allow the second layer 12 to adjust or slightly move axially and radially inside the host pipe 20 even under internal pressure loading. This minimizes the risk of lining 10 failure due to the unexpected deformations of the host pipe 20.

Figure 1:
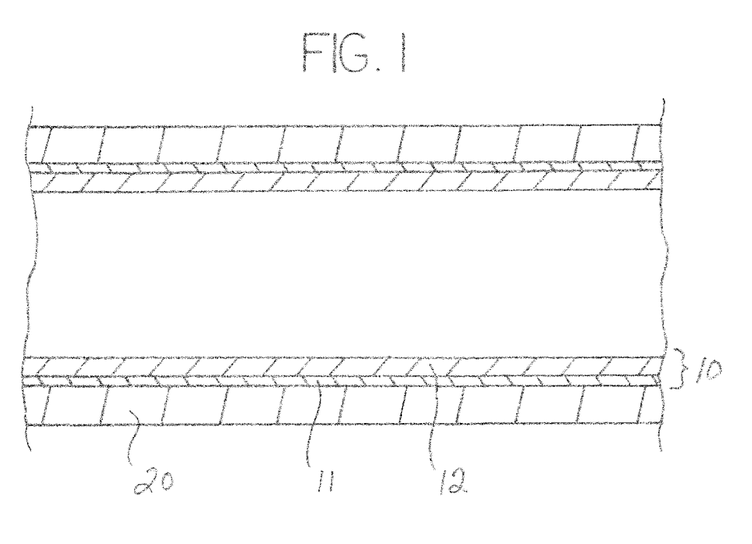
FIG. 1 is a cross-sectional illustration of a pipe showing an embodiment of a lining structure comprising an elastomeric material as a first layer and a rigid polymeric material as a second layer.
Figure 2:
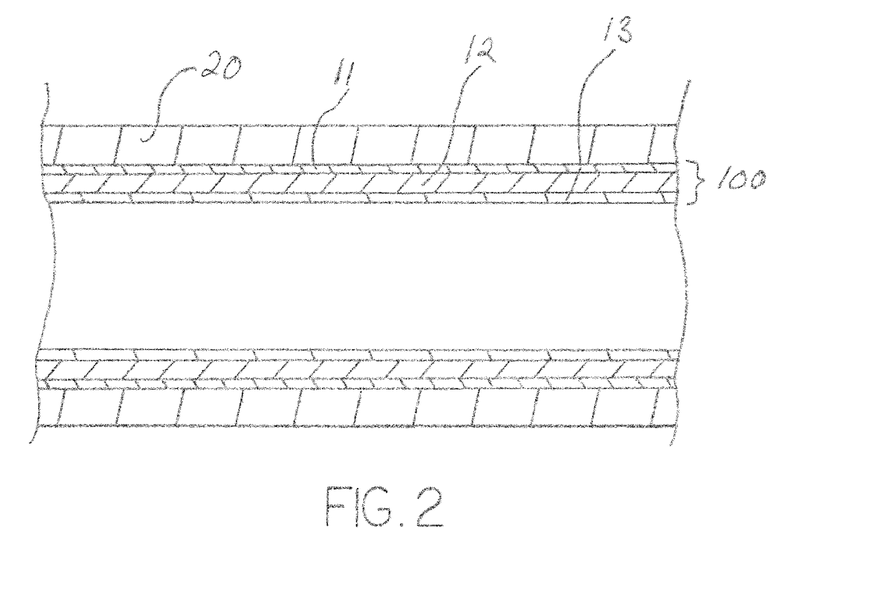
FIG. 2 is a cross-sectional illustration of a pipe showing an embodiment of a lining structure comprising an elastomeric material as a first layer, a rigid polymeric material as a second layer, and a third layer.

A further embodiment of the invention is a laminate lining or liner 100 of at least three layers, as shown in FIG. 2 wherein the first layer 11 and second layer 12 are as described above and the liner 100 further comprises a third or topcoat layer 13 applied internally to the rigid second layer 12. This third layer 13 is made of a material that provides improved properties as compared to the second layer 12, which may be required by the nature of the liquid being conveyed through the pipe. For example, the third layer 13 may be needed to provide additional abrasion, erosion or chemical resistance for liquids that are hazardous, caustic, particle-entrained, etc. This third layer 13 is intermolecularly bonded to the second layer 12. Additional layers beyond layer 13 may be applied in the same manner.

In terms of lining application methodology, the layers 11/12 may be applied with a remotely controlled or autonomous pipelining device whereby during the lining process all the lining materials are supplied to the device through an umbilical. During the lining process the layers 11/12 may be applied through centrifugally casting the material onto the internal pipe substrate 20. The elastomeric material layer 11 is applied to the internal pipe substrate 20 first, then the second layer 12 is applied on the interior of the first layer 11 before the elastomeric material of the first layer 11 fully cures to assure adequate intermolecular bonding between the layers 11/12. The materials of all the layers 11/12 may be chosen or specially developed so it is not required to heat the materials to achieve the required mechanical and physical properties when mixing the lining material components under the ambient temperature inside the host pipe environment.

Figure 3:
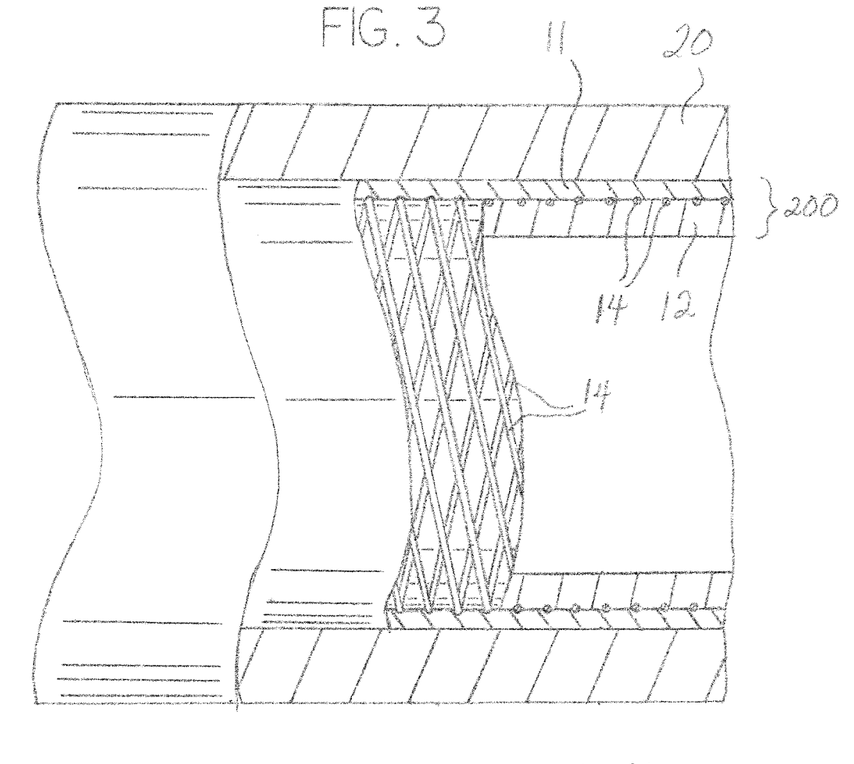
FIG. 3 is a partially exposed and partial cross-section of a pipe showing another embodiment of a lining structure comprising an elastomeric material as a first layer, a rigid polymeric material as a second layer, and an intermediary layer between the first and second layers, the intermediary layer shown as a helical filament wrapping substantially embedded in the second layer.
Figure 4:
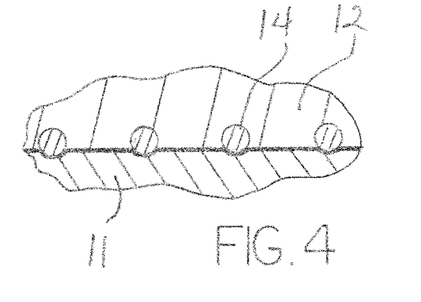
FIG. 4 is an enlarged view of a cross-sectional portion of the pipe of FIG. 3 showing the intermediary layer positioned between the first and second layers.

In another embodiment shown in FIGS. 3 and 4, the laminate liner 200 comprises an intermediate reinforcing layer 14 positioned between the elastomeric first layer 11 and the rigid second layer 12. The intermediate layer 14 is added to provide increased strength and rigidity to the laminate composite liner 200, which allows the second layer 12 to be formed with lesser inherent strength and rigidity, such as by choosing a different polymer or decreasing the thickness of the second layer 12. The intermediate layer 14 must allow the first and second layers 11/12 to bond as described above, and therefore the intermediate layer 14 is a helically wound filament layer, composed of for example carbon fiber, E-glass or Aramid fiber filaments, having relatively large open areas between the filaments.

The pitch and spacing of the intermediate layer 14 will vary depending on the diameter of the pipe 10, the material chosen, the filament dimension in cross-section, the internal pressure to be encountered, etc. For example, in typical applications the spacing between the filaments can be from approximately 0.25 to 10 inches and the filament dimension can be from approximately 0.025 to 0.375 inches.

The helically wound filament layer 14 is applied prior to full curing of the elastomeric first layer 11, but after the elastomeric layer 11 has partially cured to a degree that when the filament is applied to the interior of the elastomeric layer 11, the filament preferably adheres to the surface of the elastomeric layer 11 without any significant embedding into the body of the elastomeric layer 11 so as not to reduce or interfere with the elastic properties of the layer 11. Upon application of the second layer 12, the uncured material surrounds the majority of the filament circumference, preferably at least about 80% or the circumference, and thus the intermediate layer 14, is primarily embedded within the second layer, as shown in FIG. 4. The intermediate layer 14 may be formed, for example, of carbon fiber impregnated with a resin that is UV-, heat-, mix or ambient-curable, such that when applied to the elastomeric layer 11 the adhesive properties of the resin cause the filament to adhere to the surface of elastomeric layer 11. A resin with "shadow" curing capability would also be suitable, the resin-impregnated filament being exposed to UV light to initiate the cure, with the full cure of the intermediate layer 14 resulting from the exothermic heat produced by the curing of the second layer 12 surrounding the filaments.

It is understood that equivalents and substitutions for certain elements, structures and steps described above may be obvious to those of skill in the art, and therefore the true scope and definition of the invention is to be as set forth in the following claims.

I claim:

1. A method of lining a pipe having an inner surface comprising the steps of:
    applying a first curable polymeric material to the inner surface of said pipe, said first curable polymeric layer curing to form a cured elastomeric foam first layer having an interior;
    applying a second curable thermosetting polymeric material to the interior of said elastomeric foam first layer, said second curable thermosetting polymeric material curing to form a cured rigid second layer bonded to said first layer;
    said second curable thermosetting polymeric material being applied to said first curable polymeric material prior to said first curable polymeric material curing to form said cured elastomeric foam first layer.

2. The method of claim 1, further comprising the step of choosing said first curable polymeric material such that said elastomeric foam first layer possesses a modulus of elasticity of approximately 100 to 10,000 psi, and choosing said second curable thermosetting polymeric material such that said rigid second layer possesses a modulus of elasticity of approximately 250,000 to 750,000 psi.

3. The method of claim 1, further comprising the step of choosing said first curable polymeric material such that said elastomeric foam first layer possesses a Poison's ratio not greater than approximately 0.25, and wherein said second layer possesses a Poisson's ratio not less than approximately 3.0.

4. The method of claim 1, further comprising the step of choosing said first curable polymeric material such that said elastomeric foam first layer possesses elongation of approximately 500 to 1500%, and choosing said second curable thermosetting polymeric material such that said rigid second layer possesses elongation of approximately 1 to 25%.

5. The method of claim 1, further comprising the step of choosing said first curable polymeric material such that said first curable polymeric material begins gelling in approximately 2-300 seconds and becomes tack-free in approximately 60-600 seconds, and choosing said second curable thermosetting polymeric material such that said second curable thermosetting polymeric material has a snap cure rate of approximately 3-300 seconds and a full cure rate of 1-24 hours.

6. The method of claim 1, further comprising the step of choosing said first curable polymeric material such that said first curable polymeric material is formed of a hydrophobic/moisture tolerant polymeric material, characterized in that said first curable polymeric material does not absorb or react to moisture or fluids prior to curing and is liquid impermeable after curing.

7. The method of claim 1, further comprising the step of applying an intermediate reinforcing layer onto said first layer prior to applying said second layer.

8. The method of claim 7, wherein said intermediate reinforcing layer is composed of filaments and said step of applying said intermediate reinforcing layer comprises helically winding said filaments onto said first layer prior to full cure of said first layer.

9. The method of claim 8, wherein said step of applying said intermediate reinforcing layer comprises allowing said first layer to partially cure sufficiently such that said filaments adhere to the surface of said first layer, and further such that the majority of said filaments become embedded in said second layer when said second layer is applied.

10. The method of claim 1, further comprising the step of applying an intermediate reinforcing layer onto said first layer prior to applying said second layer.

11. The method of claim 10, wherein said intermediate reinforcing layer is composed of filaments and said step of applying said intermediate reinforcing layer comprises helically winding said filaments onto said first layer prior to said first layer becoming tack-free.

12. The method of claim 11, wherein said step of applying said intermediate reinforcing layer comprises allowing said first layer to partially cure sufficiently such that said filaments adhere to the surface of said first layer, and further such that the majority of said filaments become embedded in said second layer when said second layer is applied.

13. A method of lining a pipe having an inner surface comprising the steps of:
applying a first curable polymeric material to the inner surface of said pipe, said first curable polymeric layer becoming tack-free in less than 600 seconds, said first curable polymeric layer curing to form a cured elastomeric foam first layer having an interior;
applying a second curable thermosetting polymeric material to the interior of said elastomeric foam first layer, said second curable thermosetting polymeric material having a snap cure rate of less than 300 seconds, said second curable thermosetting polymeric material curing to form a cured rigid second layer bonded to said first layer;
said second curable thermosetting polymeric material being applied to said first curable polymeric material prior to said first curable polymeric material becoming tack-free.

14. The method of claim 13, further comprising the step of choosing said first curable polymeric material such that said elastomeric foam first layer possesses a modulus of elasticity of approximately 100 to 10,000 psi, and choosing said second curable thermosetting polymeric material such that said rigid second layer possesses a modulus of elasticity of approximately 250,000 to 750,000 psi.

15. The method of claim 13, further comprising the step of choosing said first curable polymeric material such that said elastomeric foam first layer possesses a Poison's ratio not greater than approximately 0.25, and wherein said second layer possesses a Poisson's ratio not less than approximately 3.0.

16. The method of claim 13, further comprising the step of choosing said first curable polymeric material such that said elastomeric foam first layer possesses elongation of approximately 500 to 1500%, and choosing said second curable thermosetting polymeric material such that said rigid second layer possesses elongation of approximately 1 to 25%.

17. The method of claim 13, further comprising the step of choosing said first curable polymeric material such that said first curable polymeric material begins gelling in approximately 2-300 seconds and choosing said second curable thermosetting polymeric material such that said second curable thermosetting polymeric material a full cure rate of 1-24 hours.

18. The method of claim 13, further comprising the step of choosing said first curable polymeric material such that said first curable polymeric material is formed of a hydrophobic/moisture tolerant polymeric material, characterized in that said first curable polymeric material does not absorb or react to moisture or fluids prior to curing and is liquid impermeable after curing.

* * * * *